UNITED STATES PATENT OFFICE.

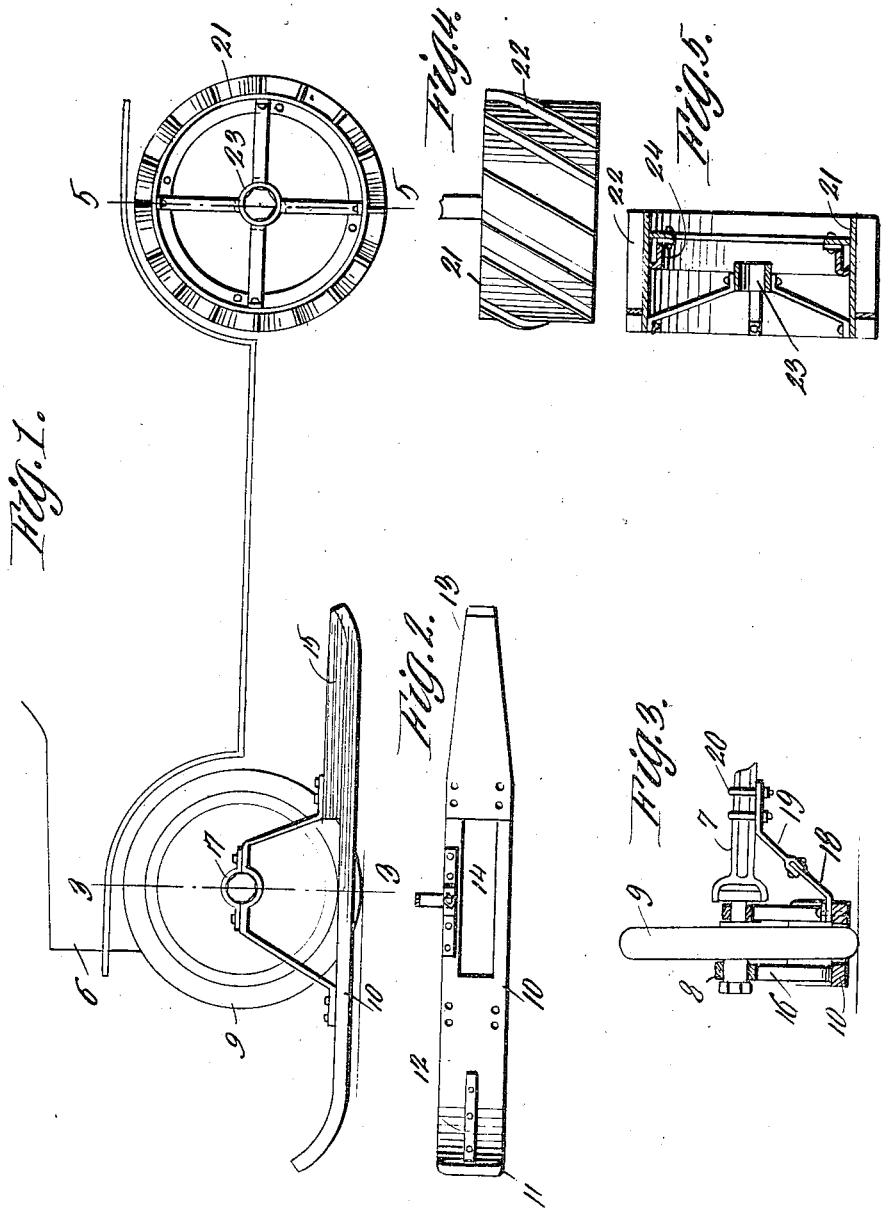

JOHN G. SCHOLZ AND EDWARD WELLER, OF BELGRADE, MINNESOTA.

SLED-RUNNER ATTACHMENT FOR MOTOR VEHICLES.

1,425,609. Specification of Letters Patent. Patented Aug. 15, 1922.

Application filed July 30, 1920. Serial No. 400,026.

*To all whom it may concern:*

Be it known that we, JOHN G. SCHOLZ and EDWARD WELLER, citizens of the United States, residing at Belgrade, in the county of Stearns and State of Minnesota, have invented certain new and useful Improvements in Sled-Runner Attachments for Motor Vehicles, of which the following is a specification.

This invention relates to sled runner attachments for motor vehicles, the primary object of which is to equip the front wheels with runners for facilitating propulsion of the vehicle in snow but permitting traction of the wheels in the usual way when travelling over the bare road.

Another object of the invention is to provide a device of this character which can be readily associated with standard types of motor vehicles, at a very small expense, without in any way curtailing the use of the steering mechanism or other apparatus normally used on the vehicle.

A further object is to provide traction wheels for the rear axle which may be used without any material change and will co-operate with the runners on the front wheels to aid propulsion of the vehicle, especially in deep snow.

The above and other objects of this invention will be in part described and in part understood from the following description of the present preferred form of the invention taken in connection with the accompanying drawings, wherein:

Fig. 1, is a side elevational view of the invention, illustrating its application.

Fig. 2, is a top plan view of one of the runners showing a portion thereof removed.

Fig. 3, is a vertical sectional view taken on the line 3—3 of Fig. 1.

Fig. 4, is a top plan view of one of the rear wheels used in this invention, and Fig. 5, is a vertical sectional view taken on the line 5—5 of Fig. 1.

In the drawings a portion of a motor vehicle 6 is shown in order to illustrate the application of my invention. The motor vehicle includes the usual type of front axle 7 with which a spindle 8 is associated, the latter carrying a wheel 9.

The runners each consist of an elongated body 10, the front end 11 of which is curved upwardly and held in position by a brace 12. The rear terminal of the runner tapers as indicated at 13 and is also curved upwardly, thereby facilitating steering of the runner in deep snow. An elongated opening 14 is formed in the runner approximately midway its ends adapted for the reception of the wheel 9. Preferably a counter-weight 15 is mounted upon the rear end of the runner 10 to normally hold the front end of the runner at a very slight inclination to facilitate lateral movement of the runner in steering.

Each runner is pendently supported by means of hanger frames 16, one being arranged on each side of the wheel as shown to advantage in Fig. 3. Each frame consists of a metal strap, one end of which is secured to the top of the runner and the opposite end secured to the top of the counter-weight 15. The intermediate portion of the strap extends upwardly and embraces the spindle 8, being held in engagement therewith by a clamping strap 17. It is to be understood that suitable types of bearing means may be associated with the hangers if desired, the present form being shown merely as illustrative.

In order to minimize side thrusts of the runners suitable braces are provided. One brace is associated with each runner and consists of a lower joint 18, one end of which is pivotally connected to the upper inner face of the runner while the opposite end is pivotally connected with an upper joint 19. The upper joint has its free end secured to the axle 7 by U-bolts 20 or other suitable securing means. It will be observed that by pivoting the brace in the manner specified slight rocking movement of the runner will be permitted as well as bodily movement of the runner when the steering knuckle is operated to turn the vehicle wheels. However, by use of the braces lateral thrusts of the runners will be eliminated.

The traction wheels used on the rear axle each consists of a relatively broad rim 21 provided with peripheral ribs 22. Braces extend inwardly from the inner periphery of said rim and support a hub 23. To use these rims it is only necessary to move the tires from the clincher rims 24 and slidably mount the traction rim thereon in a manner shown to advantage in Fig. 5. The traction wheel is held from displacement by the hub-cap which is threaded upon the rear axle in the usual way.

From the above it will be understood that the motor vehicle as equipped with this invention, is used in its entirety with the exception of the tires on the rear wheels. By forming the runners in the manner specified the front wheels will normally extend therethrough so as to engage the road of travel in the absence of snow. However, when a snow-covered road is traversed the runners will automatically assume the load with an obvious beneficial result. The construction of the traction wheels used on the rear of the vehicle are of such a nature as to insure propulsion of the vehicle even in deep snow.

What is claimed is:

In combination with sled runners suspended from the front axle of a vehicle and wheels embodying clincher rims mounted on the rear axle of the vehicle, of a relatively broad traction rim equipped with ribs on its outer periphery, braces secured to the inner periphery of said rim and terminating centrally of the latter, and a hub carried by the inner ends of said braces and engageable directly with said rear axle substantially as described.

In testimony whereof we affix our signatures in presence of two witnesses.

JOHN G. SCHOLZ.
EDWARD WELLER.

Witnesses:
MATH BAUER,
DANIEL STANG.